Aug. 31, 1954    J. H. ANDREWS    2,688,095
X-RAY CAMERA FOR UNDERGROUND GEOLOGICAL EXPLORATION
Filed June 3, 1953    2 Sheets-Sheet 1

INVENTOR
John H. Andrews
BY
ATTORNEY

Aug. 31, 1954    J. H. ANDREWS    2,688,095
X-RAY CAMERA FOR UNDERGROUND GEOLOGICAL EXPLORATION
Filed June 3, 1953    2 Sheets-Sheet 2

INVENTOR
John H. Andrews
BY
ATTORNEY

Patented Aug. 31, 1954

2,688,095

UNITED STATES PATENT OFFICE 2,688,095

X-RAY CAMERA FOR UNDERGROUND
GEOLOGICAL EXPLORATION

John H. Andrews, La Mesa, Calif.

Application June 3, 1953, Serial No. 359,385

2 Claims. (Cl. 250—65)

This invention concerns an apparatus for detecting and recording in photographic picture form images of X-rays, gamma rays, and other radiations having short wave lengths emitted from the earth and other bodies.

Previous X-ray cameras for photographing natural radiations have been of the pin-hole type and because of the small hole diameter necessary to produce an understandable picture, only a very small portion of the natural radiations were allowed to expose the film. This restriction on the amount of the radiations entering the camera has previously prevented the making of photographs of anything other than highly radioactive bodies using their own natural radiations to expose the film.

Unlike light rays or cathode rays, short wave length radiations such as X-rays, gamma rays, etc. are not reflected, refracted, or deflected appreciably by ordinary methods. It is therefore an object of this invention to provide an apparatus which will give the effect of an optical camera wherein natural radiations of low intensity and of short wave length cause a light to expose a photographic film yielding a picture of the relative strengths and directions of these radiations as they exist in nature.

It is a further object of this invention to provide a camera that will take in more of the emitted radiations from a body or bodies than previous cameras.

A still further object is to provide a camera type apparatus that is sensitive to emitted radiations and has the ability to amplify such radiations for recording thereof.

Another object is to provide an apparatus which is capable of investigating radioactive static at the earth's surface.

A still further object is to provide an apparatus which is capable under certain circumstances of making a type of photographic recording of subterranean formations, buried objects, etc.

Still other objects and attendant advantages of the invention will become apparent from a reading of the detailed description in conjunction with the drawings therein:

The method of accomplishing the desired result of this invention is by directional filtering, scanning, conversion of radiations to electrical signals, amplification of these electrical signals, conversion of these electrical signals to light signals, and photographing these light signals on to a film whose scanning movements are synchronized with those of the filter and detector.

Figure 1:
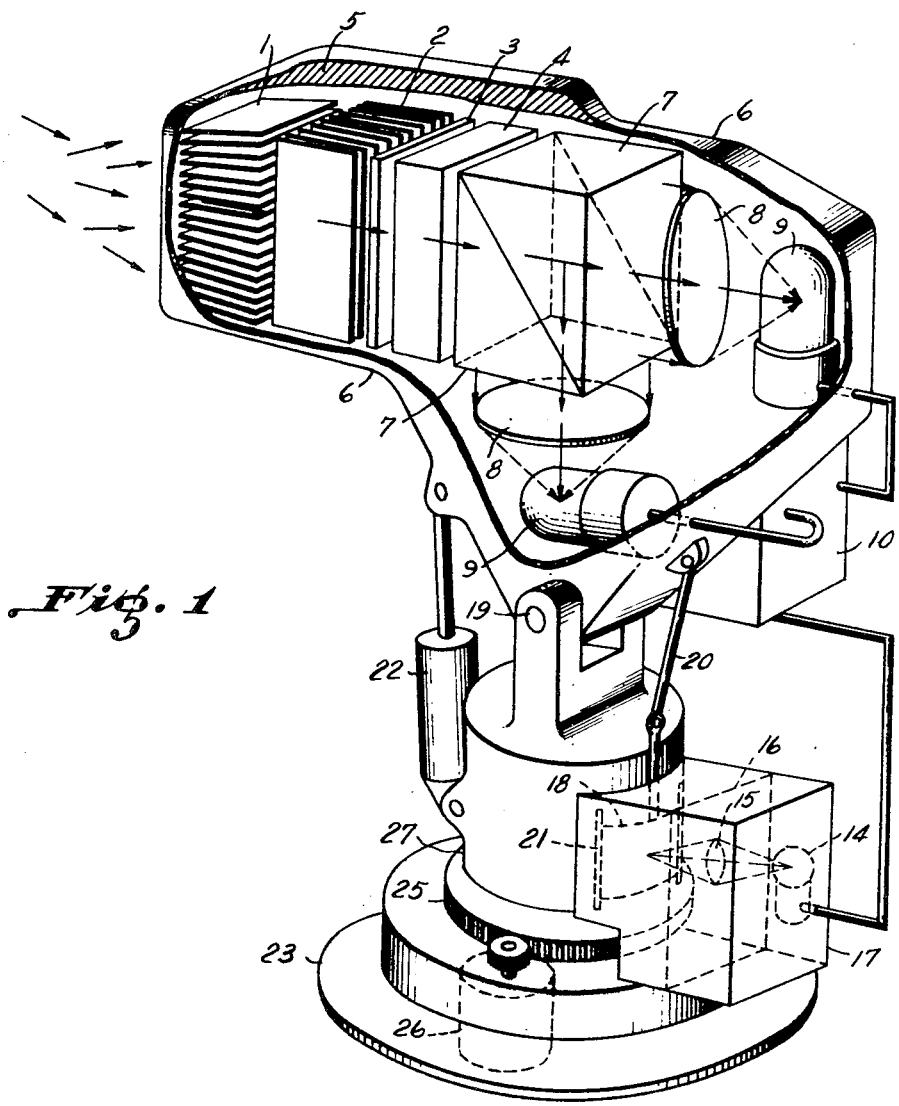
Figure 1 shows a broken-away perspective view of one embodiment of my invention.
Figure 2:
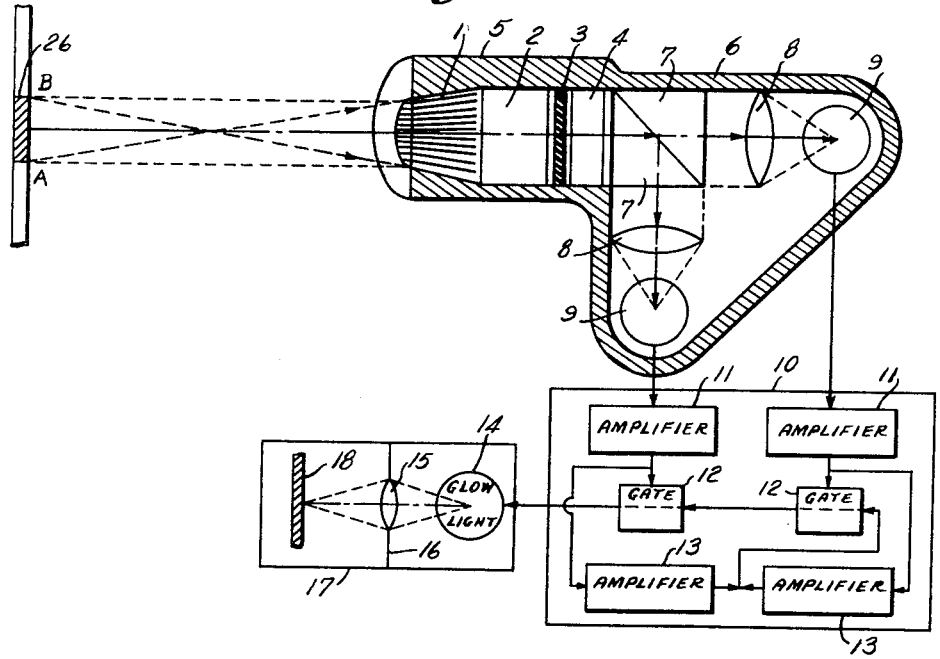
Figure 2 shows schematically the general arrangement of the filters, optical components, and the electrical circuit for the apparatus shown in Figure 1.
Figure 3:
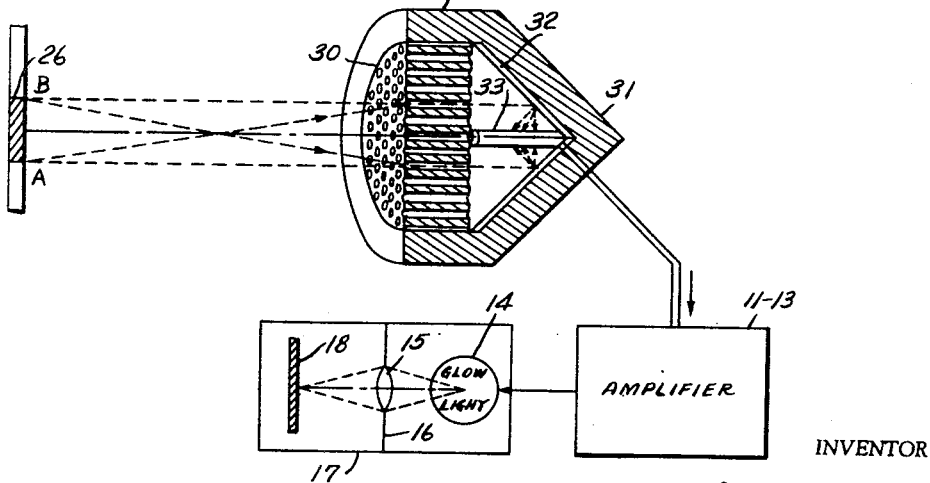
Figure 3 shows schematically another embodiment of my invention wherein another type of filter has been shown together with another type of detector arrangement utilizing a reflector shaped diffraction means.

X-rays, gamma rays and other short wave length radiations with ionizing properties emitted by the earth and other bodies arrive from random directions at the entrance to the camera in front of filter 1 (Figure 1). Filter 1 and filter 2 are both composed of a series of nearly parallel plates with small spaces between each plate. The plates may be made from metal or other dense material. The spaces between each filter plate and its neighbor in a series may be closer at the front than at the back or each plate may be tapered in thickness with the thick part forward. These two mediums when used separately or in combination will facilitate the directional control of the radiations by the filters. The direction of the plates composing filter 1 and filter 2 are at 90° to one another and the resultant effect of the two sets of filters in combination is to absorb all radiations except those having their direction substantially parallel to the axis of the camera. The dimensions of the filter plates and the spaces in between plates are such that they cause the camera to be "focused" upon a small distant area "A—B" of the emitting body as is shown in Figure 2. In place of using two sets of parallel plates for the directional filters as is described above, a single thick plate 30 of dense material may be substituted if it is honeycombed with a multitude of parallel or slightly converging holes through it as is shown in Figure 3.

After having been filtered, the radiations pass through window 3 which is opaque to light but transparent to X-rays, gamma rays, etc. Window 3 is the front of a light tight compartment 6 which houses the detection apparatus. Light tight compartment 6 also forms part of the housing which supports the filters, detection apparatus, and optical system and also protects the detector head from stray radiations including cosmic rays which would cause this instrument to yield false information. Those parts of the detector head which are particularly vulnerable to cosmic ray bombardment are protected with extra thick shielding 5 which may also form part of the housing 6, as shown.

Directly behind window 3 is a plate 4 of polystyrene, potassium iodide, naphthalene crystals, or other substance which will generate light when exposed to ionizing radiations. Behind plate 4 is a combination optical prism 7 which divides the light generated by the plate 4 and transmits it to lenses 8 where the light is condensed and forwarded on to two or more multiplier phototubes 9. Upon striking each multiplier phototube, the light causes each tube to generate an electrical signal which is fed into the input of amplifier 11.

Since present day multiplier phototubes have an inherent high noise level generated within the tube itself, it is desirable to use two or more multiplier phototubes connected to a gating circuit which passes a signal only when the signal is detected and reported by all multiplier phototubes instantaneously. This gating may be accomplished by a circuit of the type shown in Figure 2 having an input amplifier 11, an output amplifier 13, and a relay or gate 12 for each multiplier phototube used. The output of each multiplier phototube controls the output signal intensity of its output amplifier 13 and also controls its gate or relay 12 through its input amplifier 11. Each gate is in series with the gates of all other phototubes. The output currents from all output amplifiers are connected in parallel and the combined current must pass through all of the gates 12 in order to operate the glow light 14. The gates 12 may be either electromagnetic relays or grid controlled gas tubes of the Thyratron type.

If the high noise level of the multiplier phototube is not objectional for certain applications, a single multiplier phototube may be used and prism 7 and the gating mechanism 12 may be eliminated from the above.

The intensity of the light given off by the glow light 14 varies directly with the signal strength of the signal from output amplifiers 13. The glow light may be either a filament type or a gas filled tube. The light from this light 14 is condensed by means of lens 15 and focused upon a photographic film 18 both of which are inside of a light compartment 17.

In order for the radiation intensity from distant area "A—B" (Figure 2) to have meaning, it must be combined in photographic form with all of its neighbor elements of area. This is accomplished by means of a two directional scanning motion of the entire detector head and a duplication of these motions between the image of the glow light 14 on the film and the film 18. To permit scanning, the camera base 23 is equipped with a means for rotation around or back and forth about a vertical axis. The rotating portion of the base 27 has means mounted thereon for progressively tilting the detector head in elevation about a pivoted mounting 19. The driving mechanism as shown in Figure 1 is a motor driven 26 gear drive 25 for rotation of the base 27 about its vertical axis and a hydraulic cylinder 22 for tilting the detector head. Any other mechanism for tilting and rotation such as racks and gears, ratchets, lead screws, linkages, hydraulic cylinders, etc. could be used to produce these motions, if desired.

To simplify the illustration (Figure 1), the film support rack 21 is shown attached to the rotating portion 27 of the support base while the light source 14 and its optical lens 15 and light tight case 17 are shown as part of the fixed or nonrotating part of the base 23. Any suitable light tight seal such as felt could be secured to the contact surfaces of case 17 which are in adjacency to the outer surface of the rotatable base 27. This arrangement permits exact duplication of rotational motion by the photographic reproduction unit in case 17 of the motion of the detector head. The vertical movements of the detector head are transferred from the head 6 to the film 18 through linkage 20. Alternatively, both of the above described motions could be transferred from the head to a remotely located reproduction unit by means of selsyn motors or other remote control devices.

Another embodiment of my invention is shown in Figure 3 as a schematic section of the reflector type detector head and associated electrical equipment. Those unidirectional radiations passing through the filter 30 strike a reflector 31 whose inside surface is coated with crystals 32 or is covered with a ruled diffraction grating. Part of the energy from the filtered radiations passes through the crystals 32 or grating and is absorbed within the shielding composing reflector 31. Much of the remaining energy striking the crystals or grating is diffracted or dispersed in all directions. A portion of this dispersed energy arrives at the collector device 33 which may be an ionization chamber, a Geiger Muller type tube, or other radiation sensitive device. The generated signal from this radiation sensitive device 33 controls the output of amplifier 34 which in turn operates the glow light 14 described above. The shape of reflector 31 is optional depending upon the length of the collector tube but a conical reflector is satisfactory for most units. The entire detector head is surrounded with a heavy shielding 35 which blends into and forms the reflector at the rear of the head. This shielding is necessary to protect the collector tube 33 from unwanted radiations.

It is obvious that various changes and modifications may be made in the details of construction and design of the above specifically described embodiment of this invention without departing from the spirit thereof, such changes and modifications being restricted only by the scope of the following claims.

I claim as my invention:

1. A camera for recording indications of radiations of short wave lengths, said camera comprising means for directionally filtering short wave length radiations, means for detecting radiations passing through said filter means and being operative to generate a signal in response to and proportional to said detected radiations, means for supporting and moving said filtering and detecting means for movement in a scanning pattern, a light source being energized in response to and proportional in intensity to said signal, and means for imparting relative movement between said light source and a photosensitive recording medium in synchronism with the scanning movements of said filter and detector means, said detector means having a plate composed of an ionizing radiation sensitive substance behind said radiation filter, said plate being operative to generate a signal of light varying in intensity proportional to the intensity of the impinging ionization radiations, said signal light being able to pass through an optical light refractive means operable to separate said signal and to pass the same in at least two directions, a pair of light sensitive signal generative means spaced from said light refractive means and in the path of said refracted signals, and means operably connected to the output of said light sensitive means operable to compare the signals received therefrom and to pass said signals only when said signals are substantially equal, the output of the last said means being operably connected to said light source to operate said light source, said light source being operable in response to said last named output.

2. A camera for recording indications of radiations of short wave lengths, said camera comprising means for directionally filtering short wave length radiations, means for detecting radiations passing through said filter means and being operative to generate a signal in response and proportional to said detected radiations, means for supporting and moving said filtering and detecting means for movement in a scanning pattern, a light source being energized in response to and proportional in intensity to said signal, and means for imparting relative movement between said light source and a photosensitive recording medium in synchronism with the scanning movements of said filter and detector means, said detector means having a reflector shaped means behind and in the path of said radiation filter, the surface of said last named means being diffractive in character, said last named means being operable to transmit a portion of the energy of the filtered ionizing radiations to said detecting means, said detecting means being disposed within the focal region of said reflector shaped means, and the volume enclosed by said reflector shaped means being shielded from unfiltered radiations.

References Cited in the file of this patent

UNITED STATES PATENTS

| Number | Name | Date |
| --- | --- | --- |
| 1,985,715 | Bucky | Dec. 25, 1934 |
| 2,370,163 | Hare | Feb. 27, 1945 |
| 2,470,743 | Hochgesang et al. | May 17, 1949 |
| 2,549,987 | Parrish et al. | Apr. 24, 1951 |
| 2,602,142 | Meloy | July 1, 1952 |
| 2,638,554 | Bartow et al. | May 12, 1953 |